United States Patent Office.

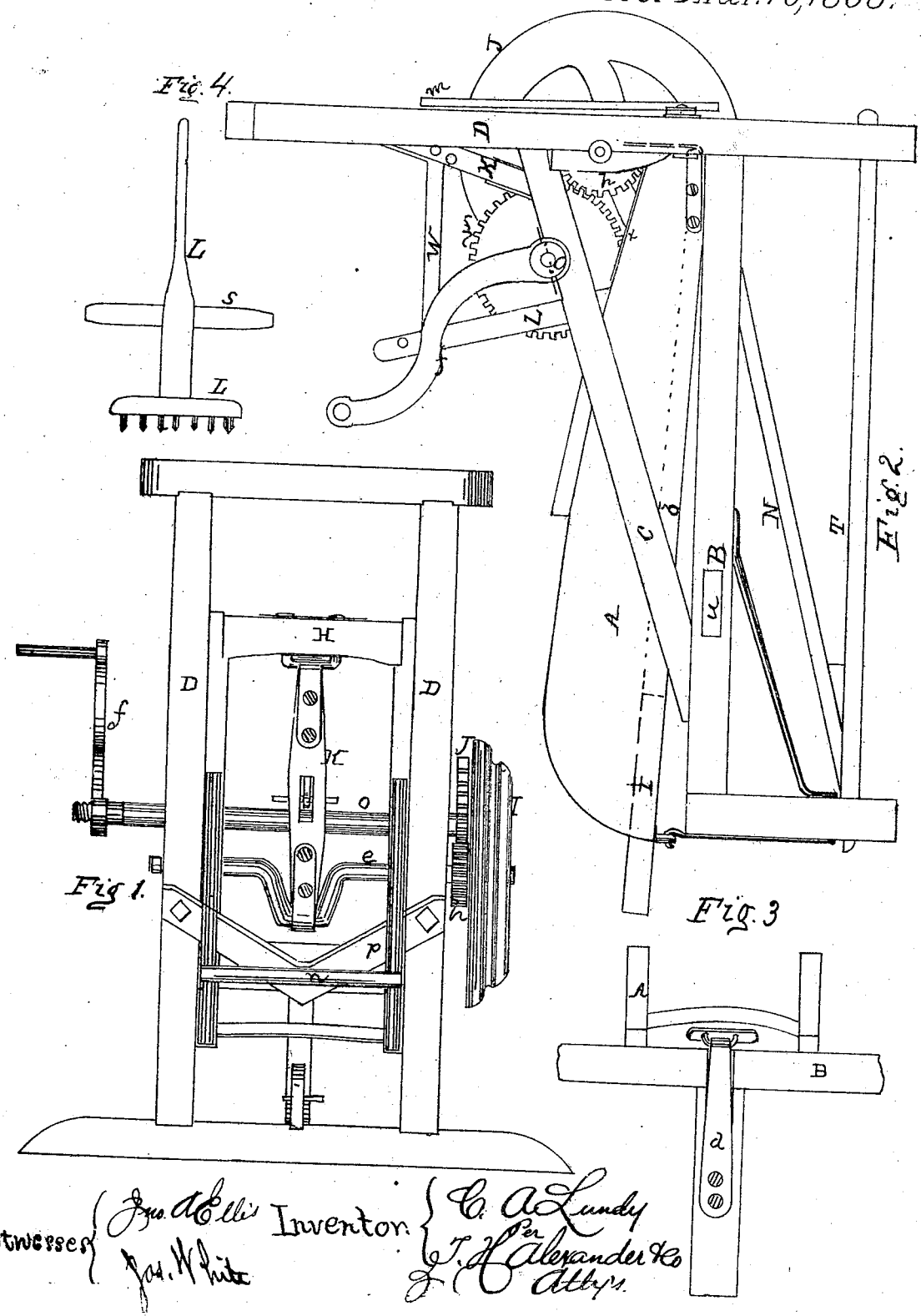

C. A. LUNDY, OF MARSHALLTOWN, IOWA.

Letters Patent No. 75,437, dated March 10, 1868.

IMPROVEMENT IN STRAW-CUTTERS.

*The Schedule referred to in these Letters Patent and making part of the same.*

TO ALL WHOM IT MAY CONCERN:

Be it known that I, C. A. LUNDY, of Marshalltown, in the county of Iowa, and State of Iowa, have invented certain new and useful Improvements in Straw-Cutters; and I do hereby declare that the following is a full, clear, and exact description thereof, reference being had to the accompanying drawings, and to the letters of reference marked thereon, which form a part of this specification. In the annexed drawings, which make a part of this specification—

Figure 1 represents a front view of my straw-cutter.

Figure 2 is a side elevation of the same.

Figure 3 represents an elevation of the rear end of box and frame.

Figure 4 is the feeder-attachment.

The letter A, fig. 2, designates the box for holding the straw. The bottom of said box is made in two divisions, $i$ and $q$, the rear division, $i$, being shown in red lines in fig. 2. B represents the frame of the straw-cutter. To the hinder leg of frame B is fastened the spring $d$; the upper end of which is secured to a staple in the bottom of division $i$. By this arrangement the box A will be allowed to have a vertical play. D represents the fender-posts, into which the frame B is mortised. The frame B and fender-posts D are strengthened by braces C. O represents a shaft, which works on the top of braces C, the said shaft having a handle, $f$, at one end, and the driving-wheel $g$ at the other end. The driving-wheel $g$ is geared into the pinion $h$, the said pinion being adjusted to crank $e$, immediately inside of balance-wheel $j$. H designates the gate, which plays in grooves cut in the inner surface of fender-posts D. K represents the pitman, which is hinged at its upper end by means of a metal strap, which strap passes through a staple in the top of gate H. A similar strap is fastened to the lower end of pitman K, and is made to embrace the wrist of crank $e$. In the front of gate H, are the springs $m$, which are bolted to the gate H only at their upper end, thereby allowing them some play at bottom. The springs $m$ are connected near their lower ends by the tie $n$. P designates a V-shaped knife, secured to the fender-posts by bolts. Midway of pitman K an oblong slot is cut to receive one end of bar W, the other end of said bar being mortised to receive the shank of feeder L. To the shank of feeder L is fastened the bar S, which is pivoted in the sides of box A. The front and rear ends of frame B are connected by brace T. On the said brace rests one end of spring N, the upper end of said spring being made to press against the bottom of box A, and by its reaction assist to raise the box A when acted on by the pitman K.

In operating my machine, it will be remarked that by turning the shaft O, the driving-wheel on said shaft will act on the pinion $h$, and thus give motion to the crank $e$, and consequently to pitman K and gate H. It will be also seen that the action of pitman K will, by means of bar W, impart a reciprocating motion to the shank of feeder L, and that this motion will feed the straw regularly to the knife P. It will be further remarked, that as the gate H is fastened to the front end of box A, the said box will at its front end partake of the vertical reciprocating motion of the gate H. When the gate H is raised to its utmost height, the section of the bottom marked $q$, and shown in dotted lines in fig. 2, will be raised at its inner end, so as to be in a line with section $i$, but when box A descends, the section $q$ will also descend at its inner end, and rest on the tie $u$, fig. 2. The object of this motion in section $q$ is to agitate the straw and expedite its descent to the knife P. When the straw is in position to be cut, it will be compressed between the metal plate $t$ and the bottom of box A, so as to subject it the more effectually to the action of the knife P. The straw will sustain additional pressure on the inner side of the knife from the bottom of gate H, and on the outside of said knife a pressure from the tie $n$. Being there held in a rigid condition, it facilitates the action of the knife.

Having thus described my invention, what I claim, and desire to secure by Letters Patent, is—

The box A, provided with the V-shaped knife, in combination with spring N, feeder L, gate H, and spring-gauge $m$, all arranged in the manner herein set forth and described.

In testimony that I claim the foregoing as my own, I affix my signature in presence of two witnesses.

C. A. LUNDY.

Witnesses:
 MILTON ELLIS,
 E. M. LYTLE.